United States Patent [19]
Ironside

[11] 3,846,760
[45] Nov. 5, 1974

[54] ENGINE CONTROL SYSTEMS

[75] Inventor: John Michael Ironside, Birmingham, England

[73] Assignee: Joseph Lucas (Electrical) Limited, Birmingham, England

[22] Filed: Mar. 6, 1973

[21] Appl. No.: 338,576

Related U.S. Application Data

[63] Continuation-in-part of Ser. Nos. 220,657, Jan. 25, 1972, and Ser. No. 220,658, Jan. 25, 1972, and Ser. No. 220,659, Jan. 25, 1972.

[52] U.S. Cl. .......................... 340/172.5, 235/150.2
[51] Int. Cl. ........................................ G06f 15/46
[58] Field of Search............ 340/172.5; 235/151.12, 235/151.33, 150.2, 151.13

[56] References Cited
UNITED STATES PATENTS

| | | | |
|---|---|---|---|
| 3,247,498 | 4/1966 | Sadvary | 340/213 |
| 3,345,616 | 10/1967 | Avril et al. | 340/172.5 |
| 3,377,471 | 4/1968 | Althaus | 235/152 |
| 3,430,206 | 2/1969 | Ernyei et al. | 340/172.5 |
| 3,590,227 | 6/1972 | Porter et al. | 235/151.12 |
| 3,688,099 | 8/1972 | Buscher | 235/150.2 |

Primary Examiner—Gareth D. Shaw
Assistant Examiner—Mark Edward Nusbaum
Attorney, Agent, or Firm—Holman & Stern

[57] ABSTRACT

An engine control system comprises a first transducer producing a first signal representative of a first engine parameter such as throttle angle, and a second transducer producing a second signal representative of another engine parameter such as engine speed. These signals are fed to a memory unit which produces an output dependent on the values of the first and second signals, and an output stage produces an output pulse which can be used to control an engine characteristic.

11 Claims, 4 Drawing Figures

ENGINE CONTROL SYSTEMS

This application is a continuation in part Application of my Application, Ser. Nos. 220,657, 220,658, 220,659, all dated Jan. 25, 1972.

The invention relates to engine control systems.

A system according to one aspect of the invention comprises in combination a first transducer producing a first signal representative of a first engine parameter, a second transducer producing a second signal representative of another engine parameter, a memory unit, to which said signals are fed, said memory unit producing an output dependent on the values of said first and second signals, and an output stage for producing an output pulse which can be used to control an engine characteristic and which has a period of time which is equal to a first predetermined period of time and a second period of time which varies in accordance with the output from the memory unit.

Preferably, the output from the memory unit is digital and is fed to a comparator, a second increasing digital signal being applied to the comparator after the first predetermined period of time, and the comparator producing an output when the second digital signal becomes equal to the first digital signal, the output pulse being terminated when the comparator has produced at least one output signal.

Preferably, the comparator scans the output from the memory unit n times, where n is greater than 1, and terminates the output pulse only after n scannings.

Preferably, the signals applied to the memory unit are varied by small increments so that for a given value of each engine parameter, n outputs are produced cyclically by the memory unit, these n outputs being scanned in turn before the output pulse is terminated.

Where the memory unit is digital, then preferably a clock pulse generator provides an input to a counter which provides the required second input to the comparator, and a dividing network is incorporated between the clock pulse generator and the counter to provide the predetermined period of time before the output from the memory unit is scanned. Preferably, means is provided for varying the frequency of the clock pulse generator in accordance with a further engine parameter, so as to vary the length of the output pulse in accordance with said further engine parameter.

A system according to a further aspect of the invention comprises in combination a first transducer producing a first signal representative of a first engine parameter, a second transducer producing a second signal representative of another engine parameter, a memory unit to which said signals are applied, said memory unit producing a digital output dependent on the values of said first and second signals, a digital register to which the output from the memory unit is fed, an output stage for initiating commencement of an output pulse used to control an engine characteristic, and terminating said output pulse when the digital register has produced n outputs, where n is at least 2, the digital register being controlled by counting means which is operated as a result of commencement of an output pulse and scans the output of the register n times, each scanning causing the digital register to produce an output after a period of time dependent on the value of the signal fed to the digital register by the memory unit.

Preferably, the signals applied to the memory unit vary by small increments so that for a given value of each parameter, n outputs are produced cyclically by the memory unit, these n outputs being scanned in turn before the output pulse is terminated.

Preferably, the digital register is a comparator which receives a digital input from the memory unit and an increasing signal from the counting means, and produces an output when the signals are equal.

A system according to yet a further aspect of the invention comprises in combination a first transducer producing a first signal representative of a first engine parameter, a second transducer producing a second signal representative of another parameter, a memory unit to which said signals are fed, said memory unit producing a digital output dependent on the values of said first and second signals, a digital register to which the output from the memory unit is fed, an output stage for initiating an output pulse used to control an engine characteristic, and terminating said output pulse when the digital register has produced at least one output, the digital register being controlled by a pulse generator which is operated as a result of initiation of the output pulse and scans the output of the register and causes the register to produce an output after a period of time dependent on the value of the signal fed to the digital register by the memory unit, and means for changing the frequency of the pulse generator in accordance with a further parameter.

In one arrangement the frequency of the pulse generator is changed in accordance with three parameters, and the pulse generator includes a capacitor which is charged by a transistor, the base current of which is determined by one of the said parameters and the collector current of which is determined, for a given base current, by another of said parameters, and a thyristor the cathode potential of which is determined by the charge on the capacitor and the gate potential of which is determined by the third of said parameters, the capacitor charging through the transistor until the thyristor turns on, and then discharging through the thyristor after which the cycle is repeated.

In the accompanying drawings.

Figure 1:
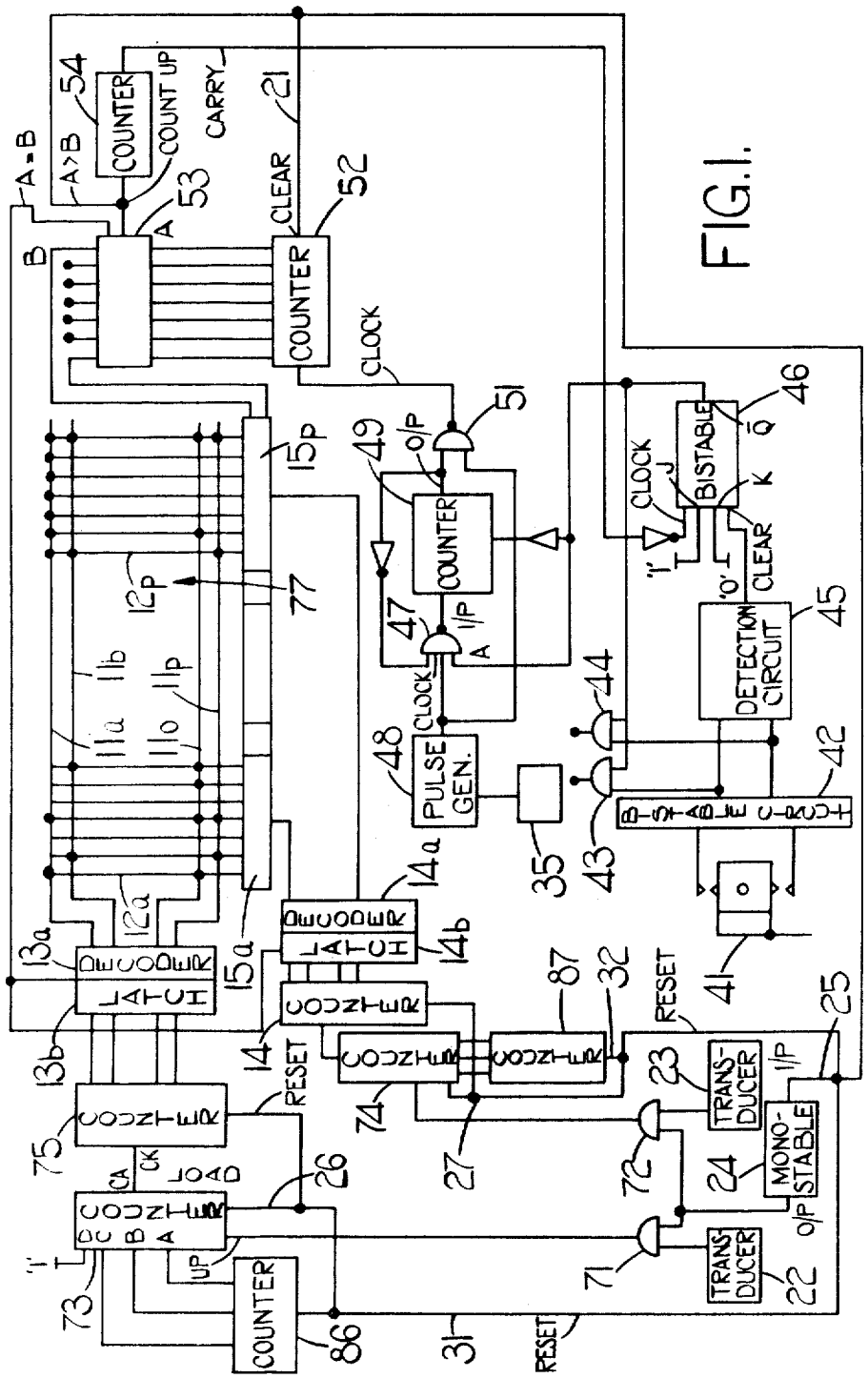
FIG. 1 is a block diagram illustrating one example of the invention.

Referring first to FIG. 1, the engine control system shown therein is used to control the injection of fuel into the engine. Any convenient means 41 driven by the engine is used to provide pulses at the instant when injection of fuel is to commence. The means 41 can take a variety of forms, and can incorporate advance and retard mechanism if such a mechanism is required for the particular engine in question. The diagrammatic arrangement illustrated closes two pairs of contacts in turn to provide input signals to a bistable circuit 42 so that the circuit 42 is driven to its first state and then to its second state and so on. When the circuit 42 is driven to its first state it provides an input to a gate 43 and when the circuit 42 is driven to its second state it provides an input to a gate 44. The circuit 42 is further connected to a detection circuit 45, which gives an output pulse each time the bistable circuit 42 changes its state in order to provide an input to trigger a bistable circuit 46, which provides an input to both gates 43, 44. Thus, once the bistable circuit 42 is triggered, one of the gates 43 or 44 will produce an output which is used to control opening of a valve supplied with fuel at constant pressure for injecting into a cylinder of the engine. The duration of the pulse fed from the bistable circuit 46 to both gates 43 and 44 is controlled in dependence on several engine parameters in the manner described below.

The engine control system further includes a diode matrix 77 consisting of 16 input lines 11a to 11 p together with 16 sets of input lines 12a to 12p, each set of lines 12 consisting of 7 separate lines. The lines 11 are energised by a decoder 13a in a manner to be described, in accordance with a signal representative of engine speed. Another decoder 14a, serves in accordance with a further signal representative of throttle angle, and in a manner to be described, to turn on one of 16 sets of switches 15a to 15p associated with the sets of lines 12a to 12p respectively, the switches 15a to 15p serving to connect one of the sets of lines 12a to 12p to a digital comparator 53. The lines 11 cross each of the lines 12, and connections between the lines are made by diodes empirically in accordance with the desired duration of the fuel injection control pulse. Thus, assuming a given value of each of the two parameters, that is to say the engine speed and the throttle angle, then one of the lines 11 will be energised and one of the sets of switches 15 will connect one of the sets of lines 12 to the comparator 53. In the drawing, dots indicate diode connections, and by way of example, when the decoder 13 energises the line 11a the decoder 14 operates the switches 15a, then the comparator will receive a signal 1001000, where 1 indicates a diode connection and 0 indicates no connection. Similarly, with the line 11a still energised but the switches 15p energised, the signal received by the comparator 53 will be 1111111. It will be realised of course that for simplicity only 4 of the 16 lines 11 and only 2 of the 16 groups of lines 12 are shown.

The manner in which the lines 11 and 12 are energised in accordance with the two parameters will be described in detail later, but for the moment it will be assumed that the comparator 53 receives a 7 bit input signal. The bistable circuit 46 serves when triggered in addition to its function already described, to provide an input to a gate 47 which also receives an input from a pulse generator 48 operated at a predetermined frequency. Also incorporated in the system are a counter 49 and a gate 51, but for the moment these components will be ignored and it will be assumed that when the gate 47 receives an input from the bistable circuit 46 it passes on pulses from the generator 48 to a counter 52. The counter 52 is connected to a comparator 53 which also receives an input from the matrix 77.

At the commencement of an ouptut pulse, the generator 48 starts to provide pulses to the counter 52 (still ignoring the counter 49). When the reading of the counter 52 is greater than the reading of the input to the comparator 53, an output pulse is provided to a counter 54, and at the same time the counter 52 is reset by way of a re-set line 21. This operation is repeated until the counter 54 has received a predetermined number of input pulses. This arrangement enables the input to the comparator 53 to be inspected a large number of times, so that variations in the input are catered for. The total period of time taken for the counter 54 to be triggered a predetermined number of times determines the length of the output pulse and will of course depend on the mean value of the parameters fed to the comparator 53, and when the required number of pulses have been received by the counter 54, it triggers the bistable circuit 46 which terminates the fuel injection pulse provided at the output of the bistable circuit 46. The cycle is then repeated next time the bistable circuit 46 is triggered.

The purpose of the counter 49 and the gate 51 is to enable a fixed delay to be incorporated before the counter 52 is operated by pulses from the generator 48. It will be seen that when the gate 47 conducts, the counter 49 must receive a predetermined number of pulses before it provides an input to the gate 51, which then operates to feed the counter 52 by virtue of its connection to the generator. A further output from the counter 49 then blocks the gate 47. The purpose of incorporating such a delay is to increase the length of an output pulse for a given signal at the input to the comparator 53, the increase being for a fixed length of time assuming a given frequency of the generator 48. In other words, even for a zero signal at the input to the comparator 53, there will be an output pulse of predetermined length. Since in a practical arrangement there is almost always a minimum pulse length required, the provision of the delay permits the matrix to be used over a smaller range of pulse times, so that the resolution of the matrix is improved.

Referring now to the rest of the circuit, the two parameters which are used to control the length of the output pulse, namely the engine speed and the throttle angle, operate transducers 22 and 23 respectively which produce alternating signals at a frequency depending on the parameter value, the two signals being fed to gates 71, 72 which are opened by a signal from a monostable circuit 24 for a predetermined length of time, the opening of the monostable circuit 24 being controlled by the output from the comparator 53 by way of a line 25 so that each time the comparator 53 passes a signal to the counter 54, the monostable circuit 24 is caused to operate for its predetermined period of time. When the gates 71 and 72 are open, the alternating signals are fed to a pair of counters 73 and 74 respectively, each of the counters 73 and 74 being cleared at the same time as the monostable circuit 24 by way of lines 26 and 27. Counters 73 and 74 are connected to further counters 75 and 114 respectively and the arrangement is such that each time a counter 73, 74 is full it passes on a signal to the respective counter 75 or 114. Thus, since the gates 71 and 72 are kept open for a predetermined time, the readings which are impressed on the pairs of counters 73, 75 and 74, 114 are determined by the frequencies of the signals controlled by the parameters, the most significant digits of these readings being stored in the counters 75 and 114 respectively, which act through latches 13b and 14b which are triggered by an output pulse from the digital comparator 53 and in turn through the decoders 13a and 14a respectively to supply signals to the lines 11 and 12 as previously explained.

In order to make use of the least significant digits which are held in counters 73, 74, to obtain a more accurate indication of the required output pulse length, a relatively small digital signal, which varies in magnitude in a cyclic manner, is applied to each of the pairs of counters 73, 75 and 74, 114. The reason for this is that the input to the matrix 77 is digital, so that if for example the line 11b is energized, the actual analogue value of the parameter may be such that although line 11b is energized, the line 11a is about to be energized. The effect is to cause the most significant digits, held in counters 75, 114 to be changed by 1 for some values of small signal, so as to sample different output signals from the memory 77.

At the beginning of each counting sequence of the signals from gates 71 and 72, the counters 73 and 74 are pre-set, by the output signal from the comparator 53, to the numbers stored in the counters 86 and 87 respectively. The counter pairs 73, 75 and 74, 114 then count the pulses from the gates 71, 72. The resulting readings in the counter pairs are the sums of the pulses from the gates 71 and 72 and the numbers stored in members 86 and 87 respectively.

Each time the comparator 53 produces an output and resets the counters 73 and 74 and also triggers the latches 13b and 14b, it steps the counters 86 and 87 once by way of lines 31 and 32, so increasing the number to be added to the counters 73 and 74. The counters 86 and 87 are cross-coupled, and the arrangement is such that the comparator 53 senses the output of the matrix 77 16 times, so that the counter 54 needs 16 inputs before it triggers the bistable circuit 46.

It will be appreciated that the 16 samplings take place very quickly indeed within an injection period, and in the description it is assumed that neither parameter changes during a short period of time.

However, it does not matter if the parameter does change, because the arrangement will still produce a mean output which is more accurate than if the counters 86 and 87 are omitted, because the input parameter will be updated for each of its 16 samples.

Figure 2:
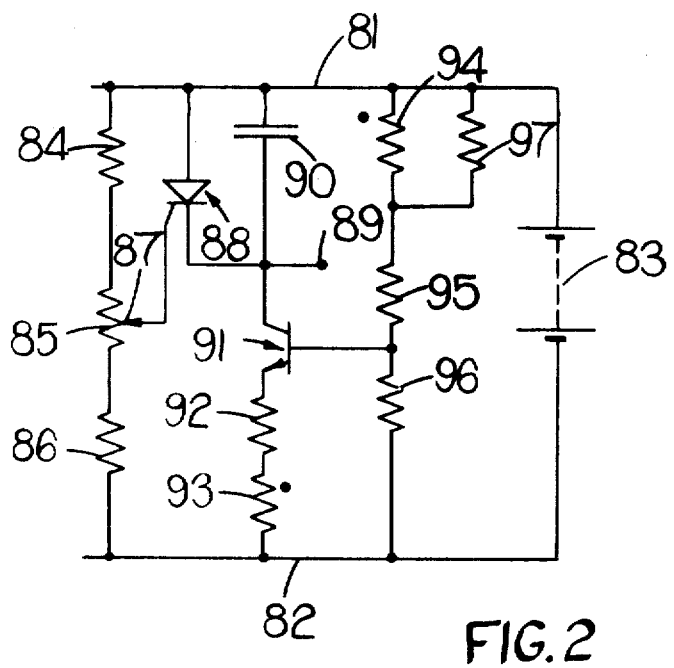
FIG. 2 shows one form of pulse generator for use in FIG. 1.

It has been assumed above that the generator 48 has a constant frequency. However, means indicated at 35 is provided for changing the frequency of the generator 48 in accordance with one or more further parameters associated with the engine, so that the delay period before the gate 51 operates is changed and similarly the time taken for counter 52 to reach a state equal to the output from the memory 77 is changed and a longer or shorter output pulse is obtained for a given input signal to the comparator 53. FIG. 2 shows on example of the generator 48 in which the frequency is adjusted in accordance with three separate parameters, namely atmospheric pressure, engine temperature, and ambient temperature. Thus, referring to FIG. 2, there are provided positive and negative supply lines 81, 82 connected to the vehicle battery 83, the lines 81, 82 being bridged by three resistors 84, 85, 86. Movable over the resistor 85 is a slider 87 in response to changing atmospheric pressure, the slider 87 being connected to the gate of a thyristor 88 the anode of which is connected to the line 81 and the cathode of which is connected to an output terminal 89 which will provide the input to the gate 47 in FIG. 1. The anode-cathodes of the thyristor 88 are bridgedby a capacitor 90, and the terminal 89 is connected to the line 82 through a series circuit including the collector-emitter of a transistor 91, a resistor 92 and a thermistor 93 which is sensitive to the engine temperature. The lines 81, 82 are further bridged by a series circuit including a thermistor 94, which is sensitive to the ambient temperature, and resistors 95, 96, the junction of the resistors 95, 96 being connected to the base of the transistor 91 and the thermistor 94 being bridged by a resistor 97. Ignoring for the moment the three parameters, the operation of the circuit is as follows. Starting with the thyristor 88 off and the capacitor 90 discharged, the potential at the terminal 89 is substantially equal to the potential of the line 81. The transistor 91 and its associated components charge the capacitor 90 at a constant rate, assuming the thermistors 93 and 94 are fixed in value. The gate of the thyristor 88 is held at a constant potential, assuming that the slider 87 does not move, and as the capacitor 90 is charged, the potential at the terminal 89 decreases until a point is reached at which the gate of the thyristor is sufficiently positive with respect to the terminal 89 to turn on the thyristor 88, at which point the capacitor 90 discharges. The current flowing through the transistor 91 is below the holding current of the thyristor 88, and so the thyristor 88 turns off and the voltage at the terminal 89 rises to the potential of the line 81. The cycle is then repeated. Since the capacitor 90 is charged at a constant rate, the output of the circuit will be at a constant frequency. It will of course be appreciated that the components are so chosen that the transistor 91 does not saturate, otherwise the rate of charging of the capacitor 90 would not be constant.

In the event that the engine temperature changes, and the other two parameters remain fixed, then the collectoremitter current of the transistor 91 will change because of the change in the value of the thermistor 93, and the rate of charging of the capacitor 90 will change, so altering the frequency of operation of the circuit. Similarly, if the ambient temperature changes, then the base voltage of the transistor 91 will change and once again the capacitor 90 will be charged at a different rate, so that the frequency will alter. In both cases, the thyristor 88 still turns off as explained above. If, however, the atmospheric pressure changes, then the slider 87 will move and change the gate potential of the thyristor 88. In this case, the level to which the capacitor 90 must charge to turn on the thyristor 88 changes, and so once again the frequency alters.

The blocks illustrated in FIG. 1 will now be more particularly described by supplying reference numbers of integrated circuits from which the blocks are made up, and by specifying connections to these integrated circuits. All the integrated circuits referred to below are obtainable, using the reference numbers given, from Texas Instruments. These devices are described by way of example in the Texas Instruments Semi-Conductor Components Data Book 2 for July 1971.

Referring first of all to the digital comparator 53, this comprises two 4-bit magnitude comparators of a circuit type SN 7485 connected together in cascade for comparing two 7 bit signals. The counters 54 and 52, and the monostable circuit 24 are connected to an A > B output of the cascaded circuits whilst a further connection is made to an A = B output of the circuits for triggering the latches 13b, where A represents the output of the counter 52 and B represents the output from the switches 15. The counter 52 comprises two 4-bit synchronous counters, circuit type Ser. No. 74163, which are connected in cascade and which possess a synchronous clear operable by a signal fed to the counter 52 along the line 21 from the digital comparator 53.

The counter 49 comprises two 4-bit binary counters, circuit type Ser. No. 7493, connected together so as to produce a 7-bit binary counter. The output of the gate 47 is connected to input A of the 7-bit counter whilst the output from this counter is connected to the gate 51. An inverter is situated in the feed back line between the output of the counter 49 and the input of the gate 47 to obtain the correct polarity signal at the gate 47. Moreover, the bistable circuit 46 is connected through an inverter to the counter 49 and serves to clear the latter.

The counter 54 comprises a 4-bit synchronous counter, circuit type Ser. No. 74193, the digital comparator 53 being connected to a count up input of the counter 54 and a carry output of the counter 54 being connected through an inverter to the bistable circuit 46.

The bistable circuit 46 comprises dual J–K master-slave flips-flops, circuit type number Ser. No. 74107, only one of the flip-flops being used. The output from the inverter connected in a line between the counter 54 and the bistable circuit 46, is connected to the clock input of the flip-flop whilst the output from the level detector circuit 45 is connected to the clear input of the bistable circuit 46. The J terminal of the flip flop is connected to a binary 1 source whilst the terminal K of the flip flop is connected to a binary 0 source. The output from the flip flop to the gates 43, 44 and 47 is taken from the Q terminal of the flip flop.

The monostable circuit 25 comprises a single monostable multi-vibrator, circuit type Ser. No. 74121, the input of which is connected to the output of a digital comparator 53 and the output of which is connected to the two gates 71 and 72.

The transducer 22 produces a frequency output proportional to engine speed and the transducer 23 produces a frequency output proportional to throttle angle. This latter transducer comprises a potentiometer, the slider of which is movable in response to the vehicle thorttle and is connected to the input of a voltage controlled oscillator for producing the required frequency output dependent on the position of the throttle.

The gates 71 and 72 allow the signal from the transducers 22 and 23 respectively to appear at the outputs of the gates 71 and 72 respectively after the monostable circuit 24 is triggered. The gates 71 and 72 each comprise quadruple 2-input positive NOR gates, circuit type Ser. No. 7402.

Figure 3:
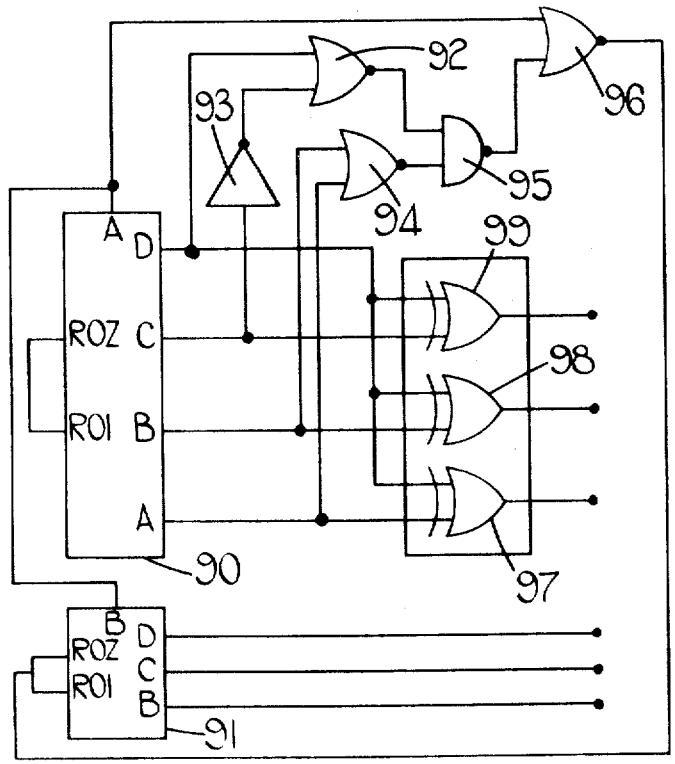
FIG. 3 shows in detail the cross coupled counters of FIG. 1.

Counters 86 and 87 are shown more particularly in FIG. 3 of the accompanying drawings and each counter 86, 87 includes a 4-bit binary counter, circuit type Ser. No. 7493 indicated by the reference numerals 90, 91 respectively. The A input terminal of the counter 90 and the B terminal of the counter 91 are connected to the output of the digital comparator 53. Output terminal D of the counter 90 is connected to one input of a 2 input positive NOR gate 92, six of which are incorporated in each circuit type Ser. No. 7402, and output terminal C of the counter 90 is connected through an inverter 93 to the other input of the NOR gate 92. Output terminals B and A of the counter 90 are connected respectively to the two inputs of a further two input positive NOR gate 94 which is similar to the NOR gate 92 and the outputs of the NOR gates 92 and 94 are connected to the two inputs of a two input positive NAND gate 95, four of which are incorporated in each circuit type Ser. No. 7400. The input terminal A of the counter 90 and the output of the NAND gate 95 are respectively connected to the two inputs of yet a further two input positive NOR gate 96 which is similar to both the NOR gates 92 and 94. The output of the NOR gate 96 is connected to the two re-set terminals of the counter 91 such that when counter 90 achieves a count of 0100, the counter 91 is set to zero. Output terminals A, B and C are connected respectively to one input of three 2-input exclusive-OR gates 97, 98 and 99 respectively, the other input of each of which is connected to output terminal D of the counter 97 four such 2-input exclusive-OR gates are incorporated in each circuit type Ser. No. 7486. Finally, the outputs of the exclusive OR gates 97, 98 and 99 are connected to the counter 73 whilst output terminals B, C and D of the counter 91 are connected to the counter 74. Finally, the inverter 93 is one of six incorporated in each circuit type Ser. No. 7404.

Each of the counters 73 and 74 comprise a synchronous 4-bit up/down counter (dual clock with clear) circuit type Ser. No. 74193. Terminals A, B and C of the up/down counters 73 and 74 are connected respectively to three outputs of the counters 86 and 87 respectively, the carry outputs of the counters 73 and 74 being connected respectively to the counters 75 and 114.

The counters 75 and 114 each comprise a 4-bit binary counter, circuit type Ser. No. 7493, the four outputs of which are connected to four inputs of the associated latch 13b, 14b Each latch 13b, 14b comprises a 4-bit bistable latch, circuit type Ser. No. 7475 which is operated by the A = B output from the digital comparator 53.

The decoder 13a comprises a 4-line to 16-line decoder from a circuit type Ser. No. 74154.

Figure 4:
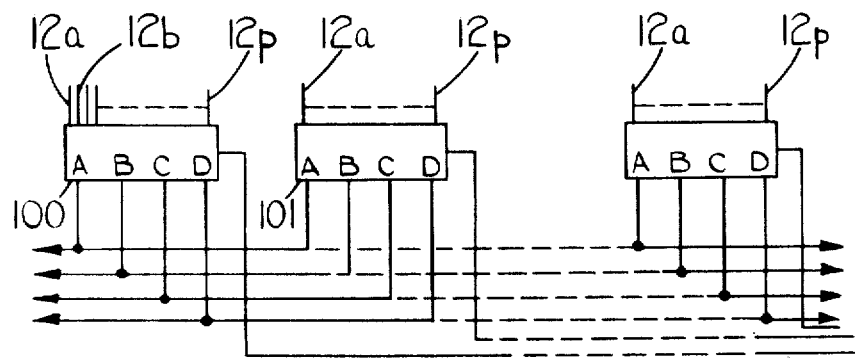
FIG. 4 shows in detail the switches of FIG. 1.

The decoder 14a together with the switches 15a to 15p will now be more particularly described with reference to FIG. 4 of the drawings. In combination these comprise seven data selectors, circuit types Ser. No. 74150, terminals A, B, C and D of each of which are connected to the output of the latch 14b. The output of each of the data selectors constitutes one of the B inputs to the digital comparator and the sixteen data inputs of the first data selector indicated by the reference numeral 100 are connected respectively to line 1 of the sixteen groups of lines 12a to 12p respectively. The second data selector indicated by reference numeral 101 has its sixteen data inputs connected respectively to line 2 of the sixteen groups of lines 12a to 12p respectively, and so on.

I claim:

1. An engine control system for an engine in which an operating function of the engine is controlled by the length of an electric pulse applied to the engine, comprising in combination a first transducer producing a first signal representative of a first engine parameter, a second transducer producing a second signal representative of another engine parameter, a programmed logic circuit means, to which said signals are fed, said logic circuit means producing an output dependent on the values of said first and second signals, a controllable output circuit means for normally producing an output pulse having a predetermined length in the absence of an output signal from said logic circuit means, said output pulse controlling said operating function of the engine, means controlled by the engine for initiating each output pulse, and means coupling said logic circuit means to the output stage, such that the length of said output pulse is increased in accordance with and upon the occurrence of said output signal from said logic circuit means.

2. An engine control system as claimed in claim 1 wherein the output from said logic means is digital, the system further including a comparator, means coupling the logic circuit means to the comparator, a second increasing digital signal being applied to the comparator after the first predetermined period of time by said logic means, and the comparator producing an output when the second digital signal becomes equal to the first digital signal, the output pulse being terminated when the comparator has produced at least one output signal.

3. An engine control system as claimed in claim 2 including scanning means coupling the comparator to the storage memory unit so that said comparator scans the output from said logic means n times, where n is greater than 1, and terminates the output pulse only after $n$ scannings.

4. An engine control system as claimed in claim 1 in which said scanning means includes means for varying the signals applied to said logic means by small increments so that for a given value of each engine parameter, n outputs are produced cyclically by said logic means, these n outputs being scanned in turn before the output pulse is terminated.

5. An engine control system as claimed in claim 2 including a counter providing the required second input to said comparator, a clock pulse generator providing an input to said counter, and a dividing network incorporated between the clock pulse generator and the counter to provide the predetermined period of time before the output from said logic means is scanned.

6. An engine control system as claimed in claim 5 wherein means is provided for varying the frequency of the clock pulse generator in accordance with a further engine parameter, so as to vary the length of the output pulse in accordance with said further engine parameter.

7. An engine control system for an engine in which an operating function of the engine is controlled by the length of an electric pulse applied to the engine, comprising in combination a first transducer producing a first signal representative of a first engine parameter, a second transducer producing a second signal representative of another engine parameter, a programmed logic circuit means to which said signals are applied, said said logic circuit means producing a digital output dependent on the values of said first and second signals, a digital register to which the output from said logic means is fed, an output circuit means for initiating commencement of an output pulse used to control said operating function of the engine, and for terminating said output pulse when the digital register has produced n outputs, where n is at least 2, counting means coupled to said digital register, said counting means serving when operative to scan the output of the register n times, each scanning causing the digital register to produce an output after a period of time dependent on the value of the signal fed to the digital register by said logic means, and means coupling said counting means to said output circuit means whereby said output circuit means initiates operation of said counting means at the same time that an output pulse is initiated.

8. An engine control system as claimed in claim 7 including means for varying the signals applied to said logic means by small increments so that for a given value of each parameter, n outputs are produced cyclically by said logic means, these n outputs being scanning in turn before the output pulse is terminated.

9. An engine control system as claimed in claim 7 wherein the digital register is a comparator which receives a digital input from said logic means and an increasing signal from the counting means, and produces an output when the signals are equal.

10. An engine control system for an engine in which an operating function of the engine is controlled by the length of an electric pulse applied to the engine, comprising in combination a first transducer producing a first signal representative of a first engine parameter, a second transducer producing a second signal representative of another parameter, a programmed logic circuit means to which said signals are fed, said logic circuit means producing a digital output dependent on the values of said first and second signals, a digital register to which the output from said logic means is fed, an output circuit means for initiating an output pulse used to control said operating function of the engine, and for terminating said output pulse when the digital register has produced at least one output, a pulse generator coupled to said digital register, said pulse generator serving when operative to scan the output of the register and cause the register to produce an output after a period of time dependent on the value of the signal fed to the digital register by said logic means, means coupling said pulse generator to said output circuit means whereby said pulse generator is rendered operative when an output pulse is initiated by said output circuit means, and means for changing the frequency of the pulse generator in accordance with a further parameter.

11. An engine control system as claimed in claim 10 including means for varying the frequency of the pulse generator in accordance with three parameters, the pulse generator including a capacitor which is charged by a transistor, the base voltage of which is determined by one of the said parameters and the collector current of which is determined, for a given base voltage, by another of said parameters, and a thyristor the cathode potential of which is determined by the charge on the capacitor and the gate potential of which is determined by the third of said parameters, the capacitor charging through the transistor until the thyristor turns on, and then discharging through the thyristor after which the cycle is repeated.

* * * * *